(12) United States Patent
Drew

(10) Patent No.: US 6,365,556 B1
(45) Date of Patent: Apr. 2, 2002

(54) SELF-LUBRICATING LINER USING POLY (P-PHENYLENE-2,6-BENZOBISOXAZOLE) FIBER

(75) Inventor: Grant Drew, Sanbornton, NH (US)

(73) Assignee: New Hampshire Ball Bearings, Inc., Laconia, NH (US)

( * ) Notice: Subject to any disclaimer, the term of this patent is extended or adjusted under 35 U.S.C. 154(b) by 0 days.

(21) Appl. No.: 09/791,093

(22) Filed: Feb. 22, 2001

(51) Int. Cl.[7] .................... C10M 125/18; F16C 27/00
(52) U.S. Cl. .................... 508/106; 384/299; 384/300; 428/422; 442/361; 442/397
(58) Field of Search .................... 508/106; 384/299, 384/300

(56) References Cited

U.S. PATENT DOCUMENTS

| 4,074,512 | A | | 2/1978 | Matt ........................... 57/210 |
|---|---|---|---|---|
| 4,232,436 | A | | 11/1980 | Chmura ........................ 419/28 |
| 4,277,118 | A | | 7/1981 | McCloskey .................. 384/300 |
| 4,655,944 | A | * | 4/1987 | Mori ........................... 508/106 |
| 4,674,164 | A | | 6/1987 | McCloskey ............. 29/898.055 |
| 4,867,889 | A | | 9/1989 | Jacobson ..................... 508/106 |
| 4,892,669 | A | * | 1/1990 | Marcora et al. ............. 508/106 |
| 5,137,986 | A | * | 8/1992 | Uy ............................... 525/432 |
| 5,427,698 | A | * | 6/1995 | Hirokawa et al. ........... 508/106 |
| 5,821,204 | A | * | 10/1998 | Kato et al. .................. 508/106 |
| 5,952,067 | A | | 9/1999 | Head .......................... 428/36.3 |
| 5,962,376 | A | * | 10/1999 | Yamazaki et al. ........... 508/106 |
| 5,989,375 | A | | 11/1999 | Bortz .......................... 156/148 |
| 6,068,931 | A | * | 5/2000 | Adam et al. ................ 428/469 |

* cited by examiner

Primary Examiner—Ellen M. McAvoy
(74) Attorney, Agent, or Firm—Pillsbury Winthrop LLP

(57) ABSTRACT

A self-lubricating liner includes poly(p-phenylene-2, 6-benzobisoxazole), polytetrafluoroethylene, and a resin. The self-lubricating liner has superior strength and temperature resistance, abrasion resistance, thermal conductivity, and low moisture regain.

104 Claims, 9 Drawing Sheets

SELF-LUBRICATING LINER USING POLY (P-PHENYLENE-2,6-BENZOBISOXAZOLE) FIBER

BACKGROUND OF THE INVENTION

1. Field of the Invention

This invention relates generally to self-lubricating bearing and bushing liners, and more particularly to self-lubricating liners that provide good high temperature wear resistance without the brittleness of glass fiber.

2. Discussion of the Related Art

It is known in the art to utilize self-lubricating bearings or bushings to provide low wear rates in a variety of high load applications. Self-lubricating liners must be resistant to damage during use, as well as during the assembly process. Self-lubricating liners must be able to withstand the heat and pressure that may be associated with use. They must also be resistant to a variety of substances, including mild acids, alcohols, oils, and water.

It is also known in the art to produce bearings containing a fibrous surface liner containing polytetrafluoroethylene (PTFE) with polymeric fibers and a resin. The PTFE fibers adhere to the resin and provide a low coefficient of friction, thus minimizing wear. For example, U.S. Pat. No. 4,074,512, to Matt, discloses a resin-impregnated PTFE fabric for use in bearing applications. Fibrous material, such as carbon, glass fibers, aramid, or other common polymer fibers, may be added as well to self-lubricating liners to increase strength and inhibit wear. Such fibers are desirable to be interwoven with the PTFE to increase the compressive strength of the fibrous composite. Brittle fibers, particularly glass and carbon fibers, may tend to break either during the bearing manufacturing process or during use. Some common polymer fibers used as liner reinforcement are known to creep under load or thermally break down when subjected at elevated temperatures and compressive loads. Accordingly, an improved self-lubricating liner having increased durability and ability to withstand increased temperature and pressure is desirable.

BRIEF DESCRIPTION OF THE DRAWINGS

FIG. 5($b$) illustrates a perspective view of a swaged spherical bearing having a self-lubricating liner according to an embodiment of the present invention;

DETAILED DESCRIPTION

Figure 1:
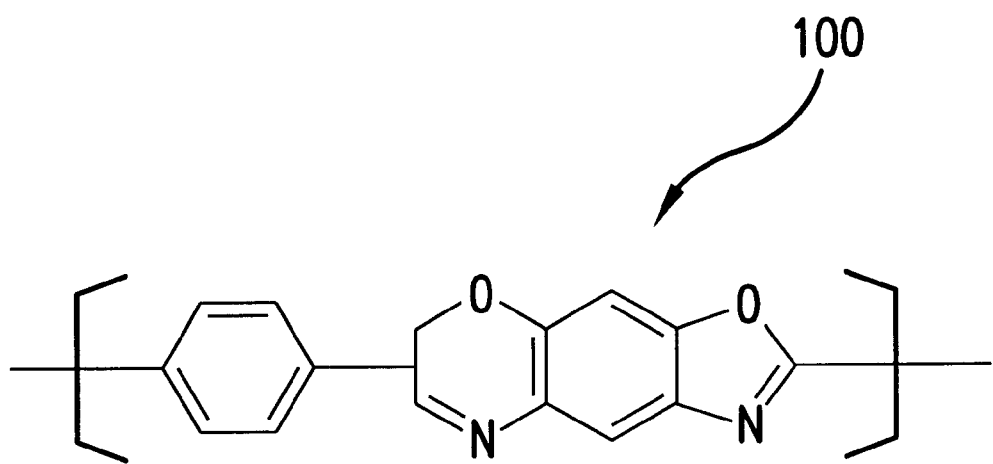
FIG. 1 illustrates a view of the chemical structure of poly(p-phenylene-2, 6-benzobisoxazole) (PBO) according to an embodiment of the present invention.

FIG. 1 illustrates a view of the chemical structure of poly(p-phenylene-2, 6-benzobisoxazole) (PBO) according to an embodiment of the present invention. Several benefits are found when poly(p-phenylene-2, 6-benzobisoxazole) (PBO) is utilized with polytetrafluoroethylene (PTFE) in a self-lubricating liner. PBO 100 is a rigid, rod-like isotropic crystal polymer having excellent mechanical properties such as tensile strength, flame resistance, and thermal stability. Further, PBO 100 exhibits superior abrasion resistance and heat conductivity. In surprising contrast to these durable qualities, PBO 100 is also very flexible and easy to work with. The inclusion of PBO 100 in liners allows the liner to remain manageable and malleable, while providing strength and stability.

The self-lubricating composition of the present invention may be used to form any type of liner. By way of example, and not of limitation, the composition may be used in woven fabric liners, laminated liners, molded liners, filament wound liners and non-woven felt liners. Further, the self-lubricating liner according to an embodiment of the present invention may be used to line a bushing, a race of a bearing device, or any other high-friction surface requiring lubrication. The method of forming a woven and a non-woven felted liner is described below. However, it should be understood that PBO 100 may be incorporated into any other self-lubricating liner known in the art.

The use of PBO 100 in self-lubricating liners is preferred over the inclusion of glass fibers, as are commonly used in the art. Glass fibers have a tendency to be brittle, and may be crushed during the manufacturing process. This is particularly true in the forming operation for a spherical bearing. This occurrence causes a reduction in quality and consistency of the liner. The crushed glass fibers may also contaminate the sliding surfaces, which could lead to abrasions on the sliding surfaces themselves. In contrast the PBO 100 fiber, due to its extremely high strength, is able to survive the forces of swaging. Thus, the inclusion of PBO 100 allows for the production of a more consistent, stronger product.

The combination of PBO 100 and PTFE provides a strong and durable self-lubricating liner. The liner of the present invention has excellent abrasion resistance, crush resistance, temperature resistance, thermal conductivity, and low moisture regain. These qualities allow the liner of the present invention to withstand the pressures associated with construction and the temperatures and pressures that are experienced during use. It is believed that the low moisture regain leads to reduced torque in lined bearings or bushings exposed to moisture and high humidity. Further, PBO 100 has higher tensile strength than aramid fibers that are frequently included in self-lubricating liners, and lower moisture regain, which lowers torque swings.

The self-lubricating liner according to an embodiment of the present invention is also capable of withstanding exceedingly high temperatures. PBO 100 is stable under extreme heat conditions, including temperatures of up to 650° C. As such, the temperature capability of the present invention is limited only by the sublimation of the polytetrafluoroethylene (PTFE), and the temperature threshold of the resin utilized.

PBO demonstrates excellent thermal conductivity. It is believed that, especially in situations involving high temperatures, the PBO will act as a conduit to transfer heat away from the moving surfaces to the material that surrounds the liner, and to the environment. Such a transfer of heat would effectively reduce the temperature between the moving parts, thus reducing temperature-induced decay of both the liner and that which it moves against.

The self-lubricating liner is preferably composed primarily of PBO 100, PTFE, and a resin. The invention should not be seen as limited to the resins utilized in the bushings tested for the purposes of this application; many resins that are known in the art may be used in the present invention. Such resins may include, but are not limited to, condensation polyimides, addition polyimides, phenolics, vinyl-phenolics, epoxies, methacrylates, cyanoacrylates, and polyester resins. The resin may be chosen based on the use for which the liner is intended. For example, a high temperature thermosetting resin may be used in devices that generate a large amount of heat, or where the liner would be exposed to high temperatures. Alternatively, a lower-temperature resin may be used in devices that do not generate, or are not exposed to, such heat.

The amount of resin that may be used to form the self-lubricating liner of the present invention may range from 10 to 60 percent by weight. Preferably, 30 to 40 percent by weight resin is used, and most preferably 35 percent by weight resin is used.

Figure 2:
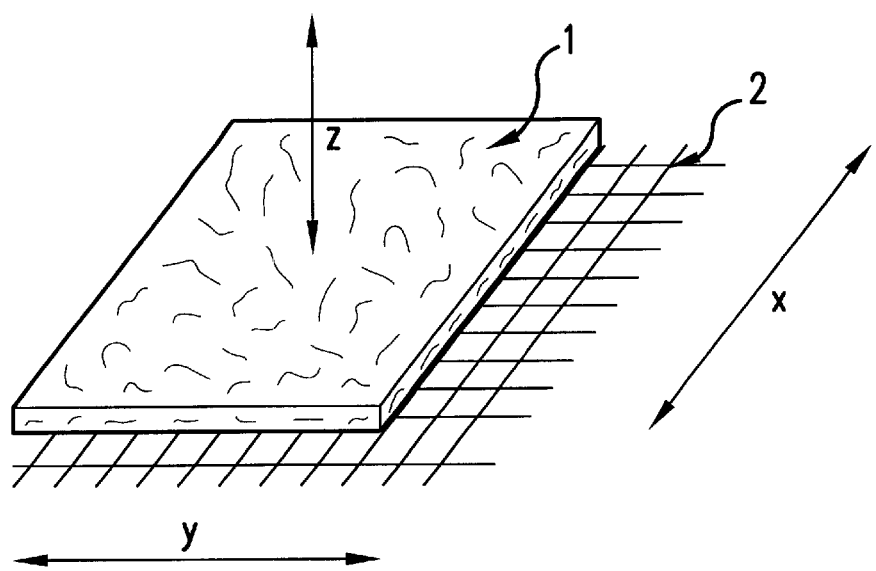
FIG. 2 illustrates a perspective view of a reinforced felted PBO fabric according to an embodiment of the present invention.
Figure 3:
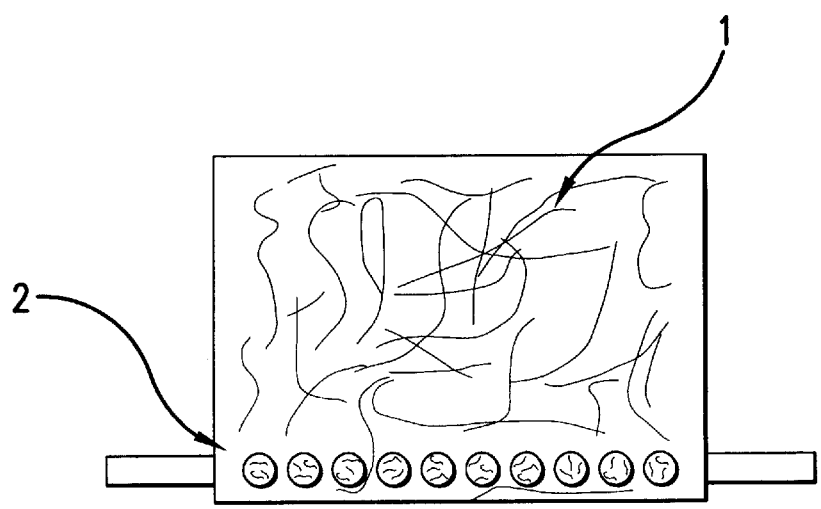
FIG. 3 illustrates a cross-section of a reinforced felted PBO fabric according to an embodiment of the present invention.

FIG. 2 illustrates a perspective view of a felted PBO fabric according to an embodiment of the present invention. A felted, non-woven self-lubricating liner may be produced by forming a non-woven fabric 1 from a mixture of PBO and PTFE by carding, layering and needling as is known in the art. The random blend or mixture of PBO and PTFE is shown in more detail in FIG. 3. While many relative percentage compositions are suitable under the present invention, most preferably, the PBO and PTFE are present in approximately a 1:1 ratio. The non-woven fabric material may be reinforced by layering a second durable fabric 2 on one side of the non-woven fabric product and integrating the two fabrics. A cross-section of the second fabric 2 is shown in FIG. 3. This second durable fabric 2 adds strength to the non-woven fabric 1 in the X-Y planar direction, which assists in preventing extrusion of the fabric during compression in the Z direction (thickness direction). This second fabric 2 is preferably stable at high operating temperatures.

Many products are suitable for use as this second fabric 2. For example, a meta-aramid fabric, such as NOMEX®, by DuPont, may be used. Alternatively, and preferably, a fabric composed in whole or in part of PBO is used. The use of PBO in the second fabric 2 tends to enhance the liner's mechanical qualities including, but not limited to, thermal stability, heat conductivity, and abrasion resistance. Of course, if the liner is to be used in an application that does not require such qualities, such as a lower temperature application, many other fabrics may be used.

The reinforced fabric is then preferably impregnated with a resin. As noted above, the self-lubricating liner according to an embodiment of the present invention is not limited to only one type of resin; many different resins may be used. For example, condensation polyimides, addition polyimides, phenolics, vinyl-phenolics, epoxies, methacrylates, cyanoacrylates, and polyester resins may be used. If necessary, the resin-impregnated fabric may be subjected to a curing step and/or a pressure molding process. The impregnated fabric may then be adhered to the area in which it is to be utilized, for example, in the raceway of a bearing. Alternatively, such curing may occur after installation of the liner in the area in which it is to be utilized.

The self-lubricating liner according to the present invention may also be formed by a weaving method. In this embodiment of the present invention, a woven fabric is formed from PBO and PTFE fibers. This fabric may then be impregnated with a resin, and adhered to the desired substrate. If necessary, the impregnated fabric may be subject to a curing step and/or a pressure molding process as discussed above. The resin may be any resin that is known in the art. For example, condensation polyimides, addition polyimides, phenolics, vinyl-phenolics, epoxies, methacrylates, cyanoacrylates, and polyester resins may be used. If necessary, the resin-impregnated fabric may be subjected to a curing step and/or a pressure molding process.

The liner of the present invention may be adhered to the chosen substrate using resin. The resin used to adhere the liner to the substrate may be the same as the resin that is impregnated into the fabric containing PBO and PTFE. Alternatively, a different resin may be used to adhere the liner to the chosen substrate.

Figure 4:
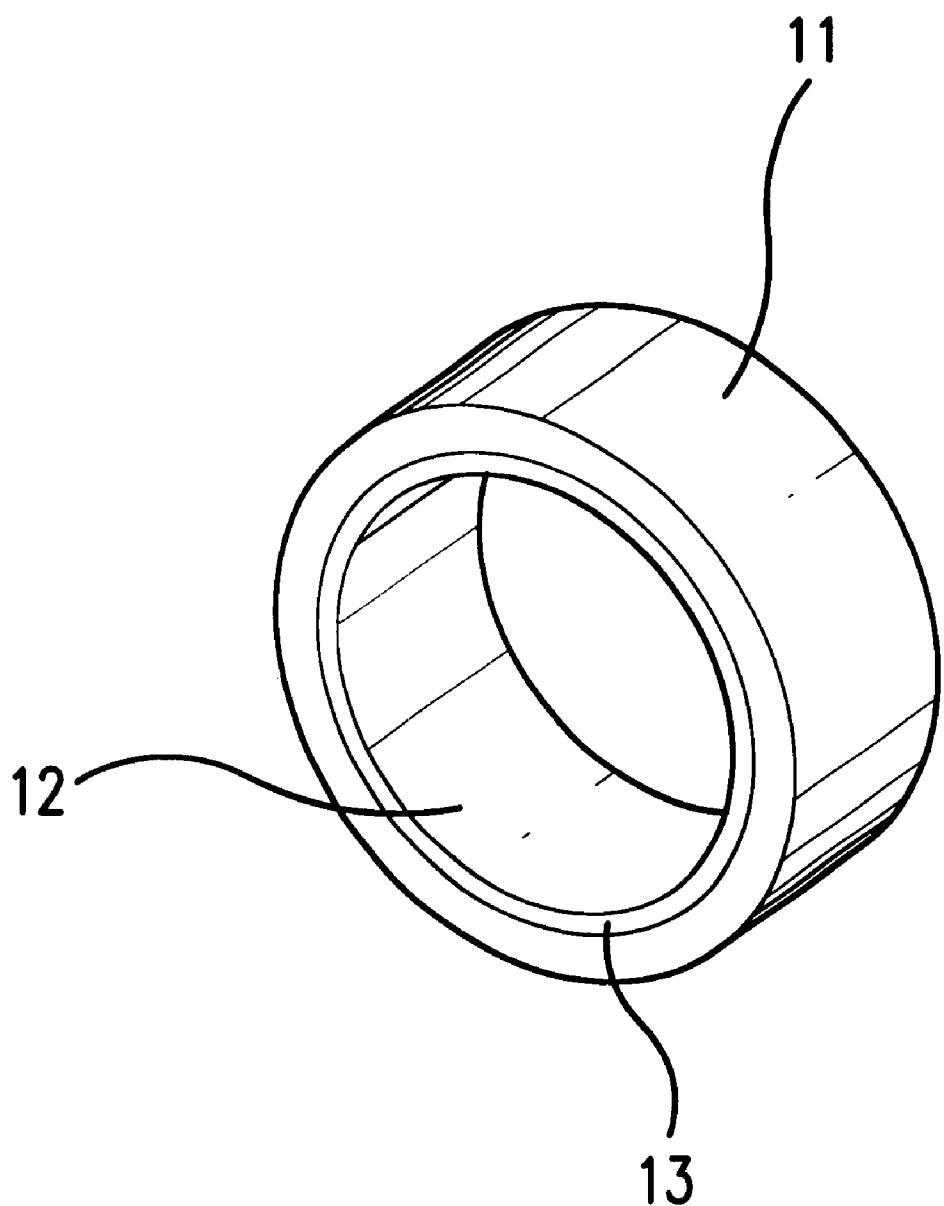
FIG. 4 illustrates a perspective view of a bushing having a self-lubricating liner according to an embodiment of the present invention.

FIG. 4 illustrates a perspective view of a bushing having a self-lubricating liner according to an embodiment of the present invention. As shown, a generally cylindrical bushing 11 has an interior cylindrical surface 13. An interior liner 12 is adhered to the interior cylindrical surface 13 of the bushing 11. The interior lining may be adhered to the bushing, or any other chosen substrate, using a resin as an adhesive. The adhesive resin may be the same resin that was used to impregnate the reinforced fabric, one with similar properties, or any resin with properties that are suitable for use in the given application.

Figure 5A:
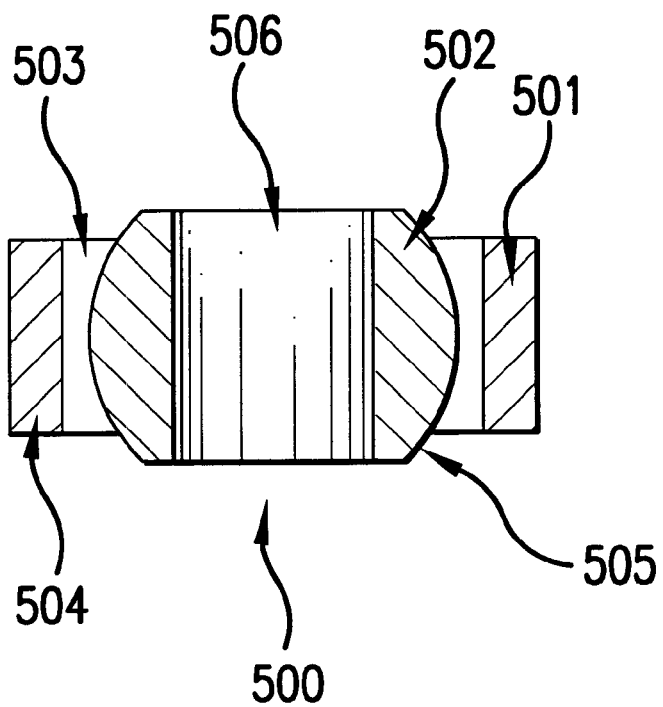
FIG. 5($a$) illustrates a perspective view of spherical bearing 500 having a self-lubricating liner according to an embodiment of the present invention in an un-swaged state.

FIG. 5(a) illustrates a perspective view of spherical bearing 500 having a self-lubricating liner according to an embodiment of the present invention in an un-swaged state. A swaged view of spherical bearing 500 according to an embodiment of the present invention may be seen in FIG. 5(b). The spherical bearing 500 generally comprises three parts: an outer bearing member 501, an inner bearing member 502 and a bearing liner 503. The inner bearing member 502 has a convex outer surface 505. In an un-swaged condition, the outer bearing member 501 has generally rectangular appearance. It a swaged condition, the inner bearing surface 504 of outer bearing member 501 has a concave shape and the outer bearing surface 507 of outer bearing member 501 has an outer convex, cylindrical surface 507.

Figure 5B:
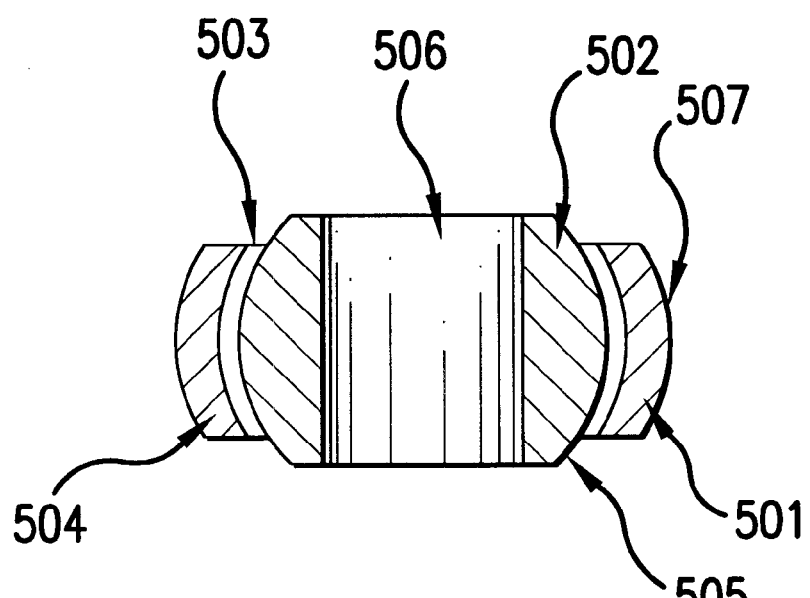

The bearing members 501 and 502 may be formed of any suitable material that is known in the art, but are preferably metallic. The inner bearing member 502 may be provided with a central bore 506 through which a joining element such as a bolt (not shown) may be run for operationally attaching the inner bearing member 502 to an associated apparatus or machine (not shown). The self-lubricating liner 503 of the embodiment of the present invention that is shown in FIGS. 5(a) and 5(b) is located between the inner bearing member 502 and the outer bearing member 501. The liner 503 may be adhered to either the inner bearing surface 504 of the outer bearing member 501 or the convex outer surface 505 of the inner bearing member 501.

In an alternate embodiment of the present invention, the self-lubricating liner may be used in apparatuses, machines, or elsewhere where the surface of a first body contacts the surface of a second body. The device of such an embodiment may be referred to as a contact-bearing member. In this embodiment, the liner may be adhered to one of the two surfaces so that the two surfaces experience less frictional forces as they pass over one-another. A contact-bearing member may be used, for example, where two surfaces are likely to come into moving contact with one another. This could occur, for example, if one or both of the surfaces are likely to expand or contract due to changes in temperature. It should be understood that, to form a contact-bearing member, the liner of the present invention may be adhered to either the first or the second surface, depending on ease of manufacturing, ease of installation, and other factors.

Figure 6:
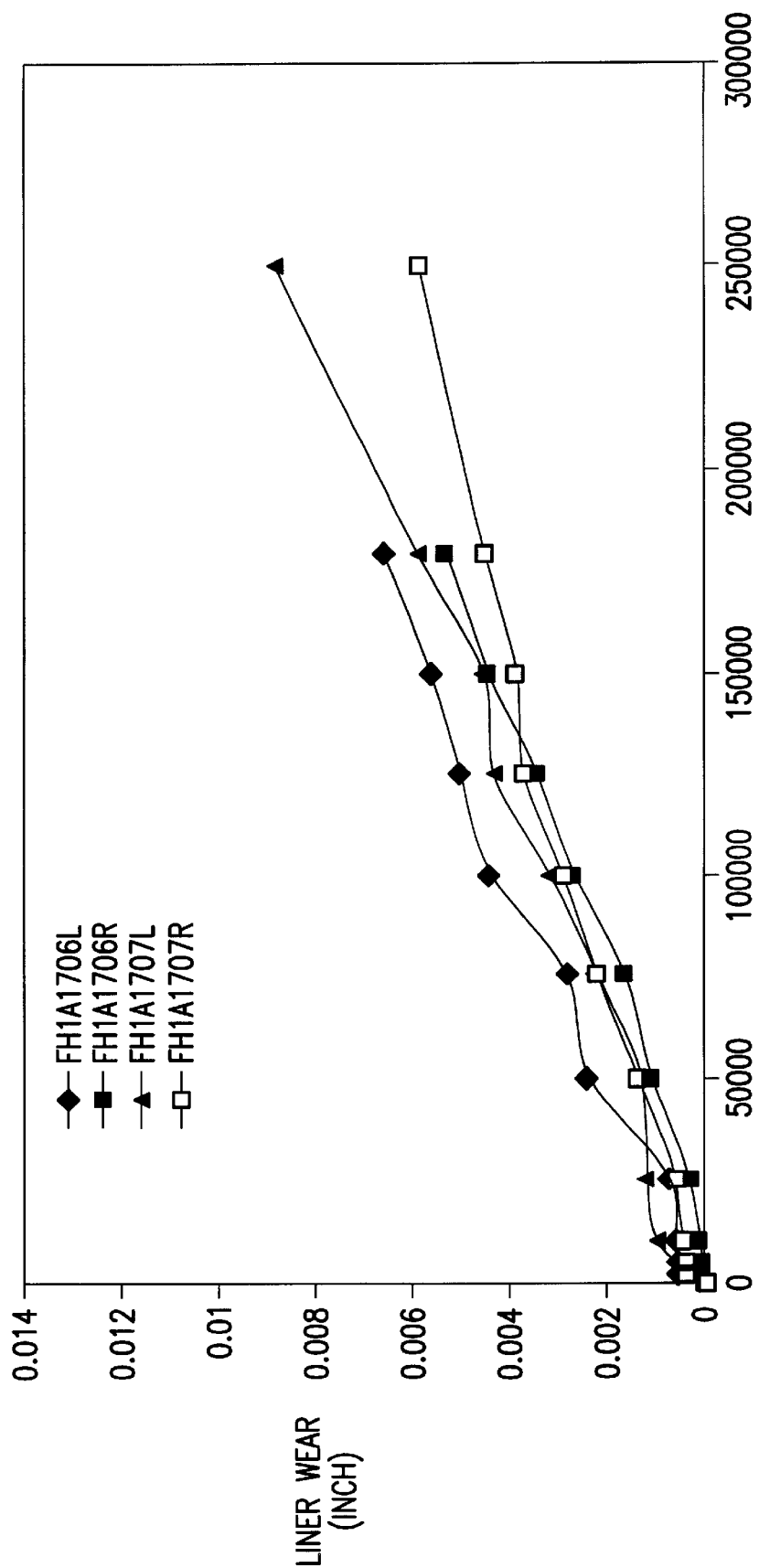
FIG. 6 illustrates a graph showing the wear in inches to a self-lubricating bushing liner over the life of the bearing according to an embodiment of the present invention.
Figure 7:
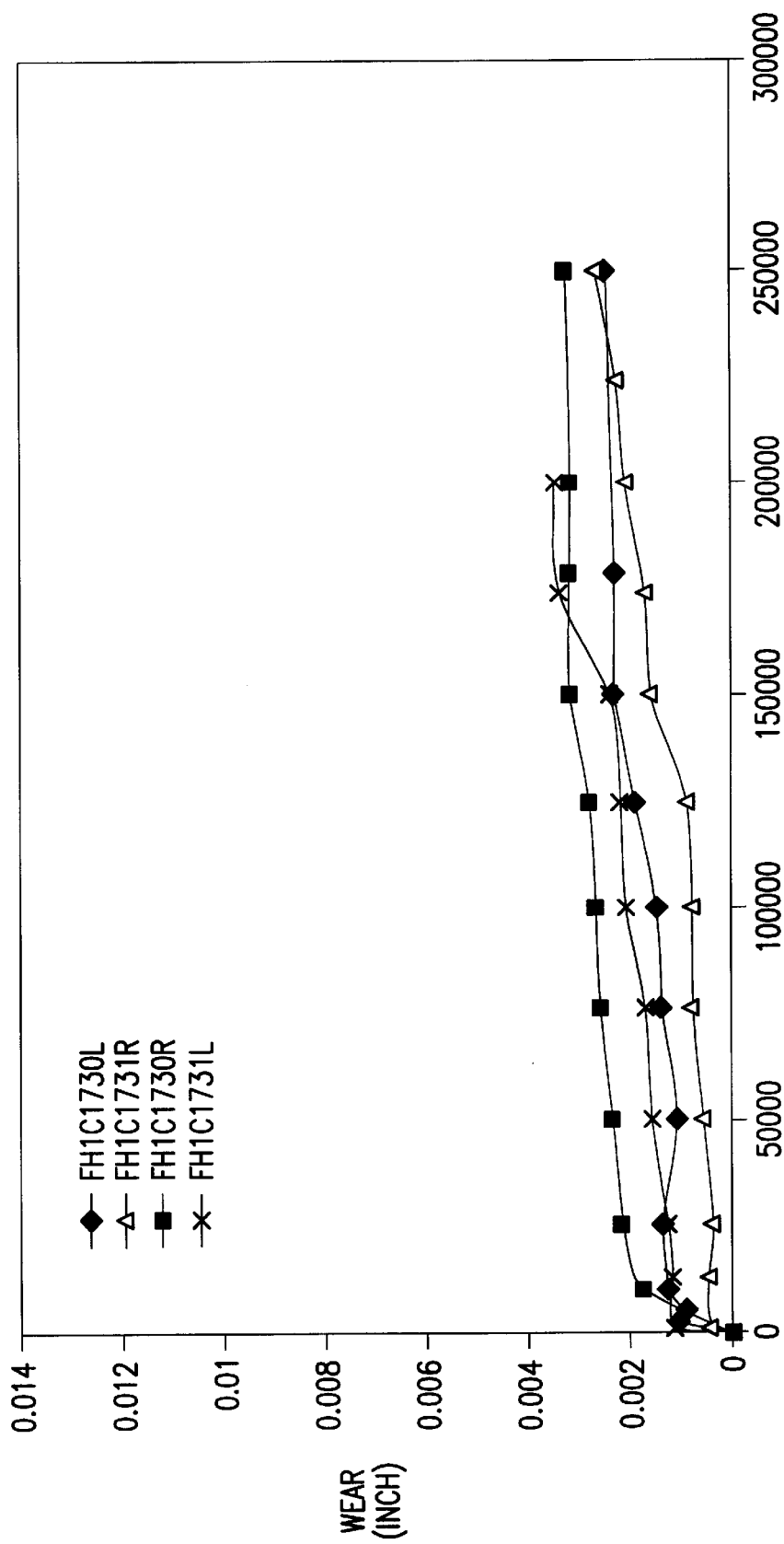
FIG. 7 illustrates a graph showing the wear in inches to a self-lubricating bushing liner over the life of the bushing according to an embodiment of the present invention.

FIGS. 6 and 7 illustrate a graph showing the wear in inches to a self-lubricating bushing liner over the life of the bushing according to an embodiment of the present invention. The self-lubricated bushing material used for these tests was formed using the process described above. The results detailed in both of these graphs were obtained by running the tests at 12.5 kilopounds per square inch (KSI) stress, 570° F. (300° C.), 60 cycles per minute (CPM) and ±25° oscillation.

In the example of FIG. 6, the resin used to form the self-lubricating material was Cycom 3002, a condensation polyimide. The resin used to form the self-lubricating material in the example shown in FIG. 7 is PMR-II-50, an addition polyimide resin, which has increased temperature capabilities. As extrapolated from FIG. 6, the average wear over a lifetime of 180,000 cycles for the four 1-inch bushings incorporating the condensation polyimide resin is 0.0054 inches. A similarly low wear may be seen in FIG. 7 for the four bushings incorporating PMR-II-50. The average wear shown in FIG. 7 for the four bushings tested over a lifetime of 180,000 cycles is 0.0027 inches.

As may be seen from FIGS. 6 and 7, the liner incorporating the polyamide addition resin shows less wear over the life of the bushing under the given conditions than the liner incorporating the condensation polyamide resin. Further, both of these liners show a marked improvement over the prior art. Generally, the self-lubricating liners that are known in the art show greater wear over the same lifetime, under similar conditions. This marked improvement over the present state of the art is due to the inclusion of PBO in the self-lubricating liner.

Figure 8:
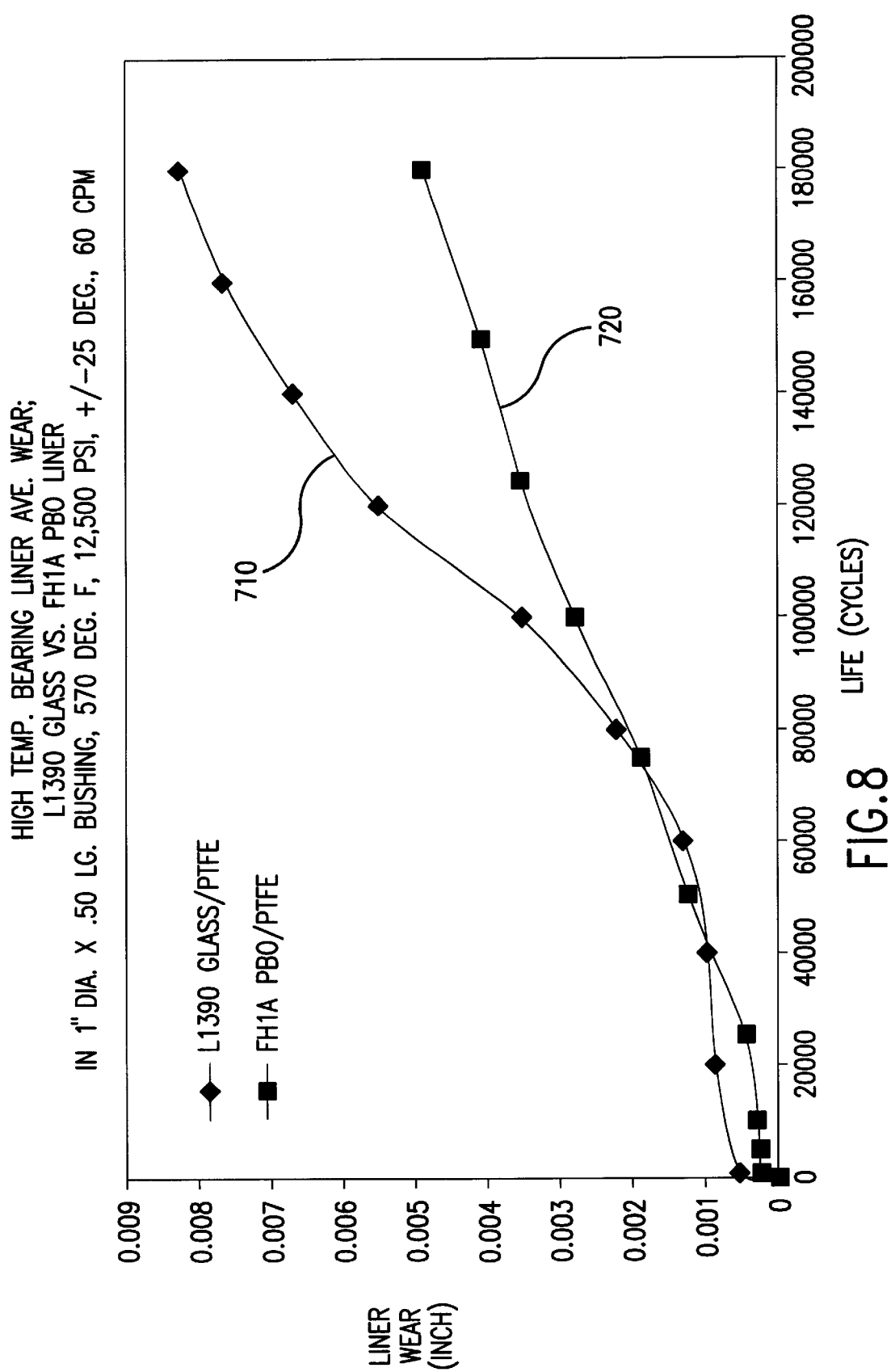
FIG. 8 illustrates a graph showing a comparison of the average wear in inches to a self-lubricating bearing liner according to an embodiment of the present invention versus the wear in inches to a self-lubricating bearing liner that incorporates glass fibers.

FIG. 8 illustrates a graph showing a comparison of the average wear in inches to a self-lubricating bearing liner containing glass fibers, as is known in the art, versus the wear to a self-lubricating bearing liner containing PBO, according to an embodiment of the present invention. The results detailed in this graph were obtained by running the tests at 12.5 KSI stress, 570° F. (300° C.), 60 CPM and ±25° oscillation. The bearings were one inch in diameter. The line 710 labeled L1390 (glass fiber data line) represents the average for the liner that incorporates glass fibers, as is known in the art, while the line 720 labeled FH1A (PBO data line) represents the average for the PBO-based liners. All self-lubricating liners tested to provide the data shown in FIG. 8 were formed using a condensation polyimide resin. As may be seen from the graph, the average wear over a lifetime of 180,000 cycles for the glass fiber liner (L1390) is 0.0083, while the average wear for the PBO liner (FH1A) over the same lifetime is 0.0049. As such, the liner containing PBO demonstrated approximately 40% less wear than the liner incorporating glass fibers. This is a significant improvement in wear over the current state of the art.

Figure 9:
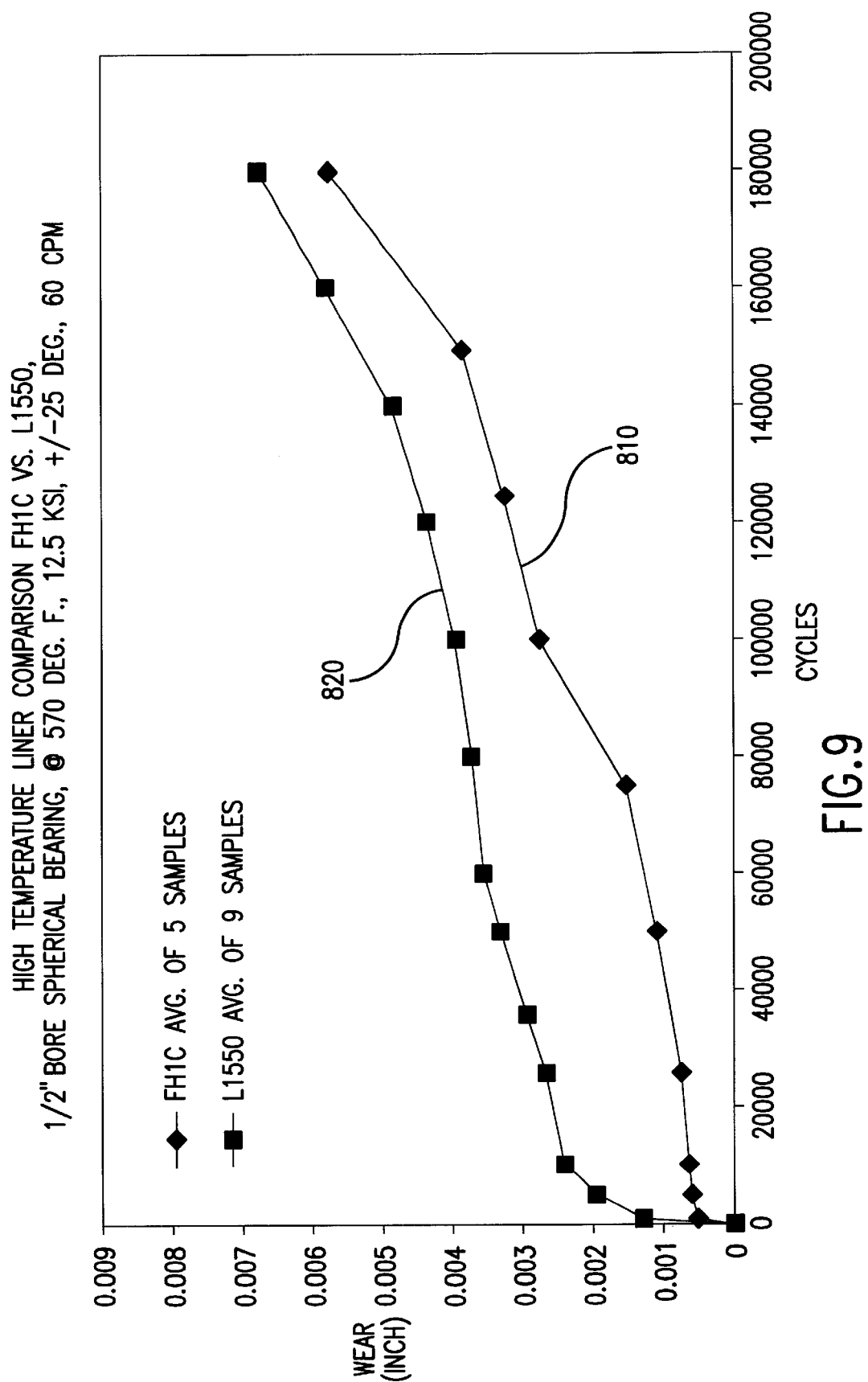
FIG. 9 illustrates a graph showing a comparison of the average wear in inches to a self-lubricating bearing liner containing glass fibers, as is known in the art, versus a self-lubricating bearing liner containing PBO, according to an embodiment of the present invention.

FIG. 9 illustrates a graph showing a comparison of the average wear in inches to a self-lubricating bearing liner containing glass fibers, as is known in the art, versus a self-lubricating bearing liner containing PBO, according to an embodiment of the present invention. The results detailed in this graph were obtained by running the tests at 12.5 KSI stress, 570° F. (300° C.), 60 CPM and ±25° oscillation. The liners tested to obtain the data shown in FIG. 9 were incorporated in spherical bearings having a ½ inch bore and were formed using an addition polyimide resin. The line 810 labeled FH1C (PBO data line) represents the average for the PBO-based liners, while the line 820 labeled L1550 (glass fiber data line) represents the average for the liner that incorporates glass fibers, as is known in the art. Five liners incorporating PBO were tested to obtain the PBO data line, and 9 liners incorporating glass fibers were tested to obtain the glass fiber data line. As may be seen from the graph, the average wear over a lifetime of 180,000 cycles for the glass fiber liner is 0.0068, while the average wear for the PBO liner over the same lifetime is 0.0058. The PBO liner showed approximately 15% less wear than was demonstrated by the liner incorporating glass fibers. This lower amount of wear shows that the liner incorporating PBO has a clear improvement in durability over the glass fiber liner that is known in the art.

Figure 10:
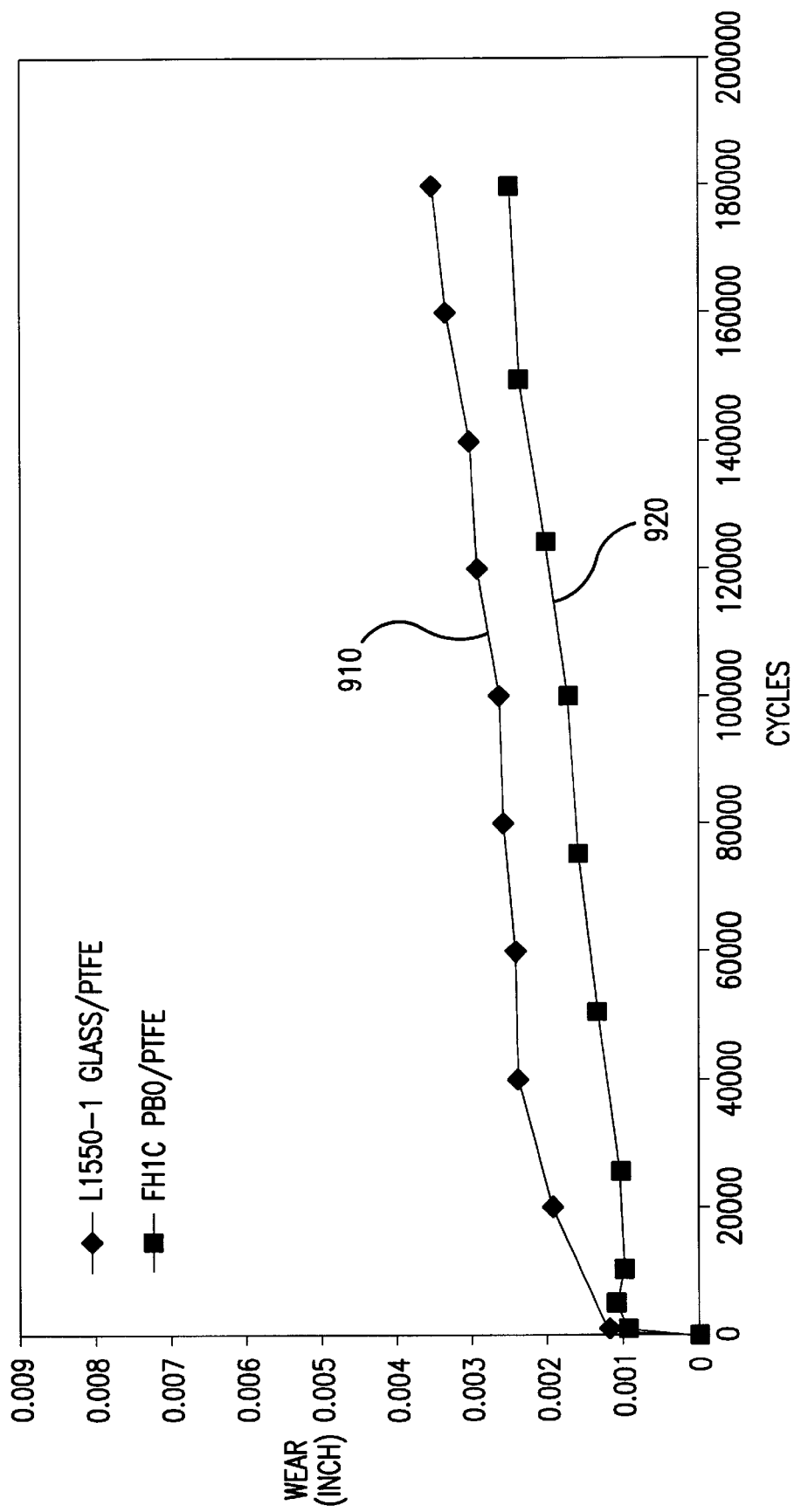
FIG. 10 illustrates a graph showing a comparison of the average wear in inches to a self-lubricating bushing liner containing glass fibers, as is known in the art, versus the wear to a self-lubricating bushing liner containing PBO, according to an embodiment of the present invention.

FIG. 10 illustrates a graph showing a comparison of the wear in inches to a self-lubricating bushing liner according to an embodiment of the present invention versus the wear in inches to a self-lubricating bushing liner that incorporates glass fibers. The results detailed in FIG. 10 were obtained by running the tests at 12.5 KSI stress, 570° F. (300° C.), 60 CPM and ±25° oscillation. The bearing liners tested to obtain the data shown in FIG. 10 were incorporated in bushings having a one-inch diameter bore, and were formed using addition polyimide resins. The line 910 labeled L1550 represents the liner that incorporates glass fibers, as is known in the art. The line 920 labeled FH1C represents the liner that incorporates PBO, as is taught by the present invention. As may be seen from the graph, the wear over a lifetime of 180,000 cycles for the glass fiber liner is 0.0036, while the wear for the PBO liner over the same lifetime is 0.00255. This data shows that, over a lifetime of 180,000 cycles, bushings that incorporate PBO undergo approximately 29% less wear than bushings that incorporate glass fibers.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A self-lubricating liner, comprising:
   poly(p-phenylene-2, 6-benzobisoxazole);
   polytetrafluoroethylene; and a resin.

2. The self-lubricating liner according to claim 1, wherein the poly(p-phenylene-2, 6-benzobisoxazole) and polytetrafluoroethylene are present in an approximately one-to-one ratio.

3. The self-lubricating liner according to claim 1, wherein the liner contains from 10 to 60 percent by weight resin.

4. The self-lubricating liner according to claim 1, wherein the liner contains from 30 to 40 percent by weight resin.

5. The self-lubricating liner according to claim 1, wherein the liner contains 35 percent by weight resin.

6. The self-lubricating liner according to claim 1, wherein the resin is a condensation polyimide resin.

7. The self-lubricating liner according to claim 1, wherein the resin is an addition polyimide resin.

8. The self-lubricating liner according to claim 1, wherein the resin is a phenolic resin.

9. The self-lubricating liner according to claim 1, wherein the resin is an epoxy resin.

10. The self-lubricating liner according to claim 1, wherein the resin is a vinyl-phenolic resin.

11. The self-lubricating liner according to claim 1, wherein the resin is a methacrylate resin.

12. The self-lubricating liner according to claim 1, wherein the resin is a cyanoacrylate resin.

13. The self-lubricating liner according to claim 1, wherein the resin is a polyester resin.

14. The self-lubricating liner according to claim 1, wherein the liner further includes a meta aramid fabric.

15. A self-lubricating liner, comprising:
    20 to 70 percent by weight poly(p-phenylene-2, 6-benzobisoxazole);
    20 to 70 percent by weight polytetrafluoroethylene; and
    10 to 60 percent by weight resin.

16. The self-lubricating liner according to in claim 15, wherein the poly(p-phenylene-2, 6-benzobisoxazole) and the polytetrafluoroethylene are present in an approximately one-to-one ratio.

17. The self-lubricating liner according to in claim 15, wherein the resin is a high temperature thermosetting resin.

18. The self-lubricating liner according to claim 15, wherein the resin is a condensation polyimide resin.

19. The self-lubricating liner according to claim 15, wherein the resin is an addition polyimide resin.

20. The self-lubricating liner according to claim 15, wherein the resin is a phenolic resin.

21. The self-lubricating liner according to claim 15, wherein the resin is an epoxy resin.

22. The self-lubricating liner according to claim 15, wherein the resin is a vinyl-phenolic resin.

23. The self-lubricating liner according to claim 15, wherein the resin is a methacrylate resin.

24. The self-lubricating liner according to claim 15, wherein the resin is a cyanoacrylate resin.

25. The self-lubricating liner according to claim 15, wherein the resin is a polyester resin.

26. The self-lubricating liner according to claim 15, wherein the liner further includes a meta aramid fabric.

27. The self-lubricating liner according to claim 15, wherein the liner further includes a PBO fabric.

28. A method of producing a self-lubricating liner, the method comprising:
    providing a mixture of poly(p-phenylene-2, 6-benzobisoxazole) and polytetrafluoroethylene;
    forming a non-woven fabric from the mixture;
    layering a second durable fabric on one side of the non-woven fabric;
    integrating the second fabric with the non-woven fabric to form an integrated fabric;
    impregnating the integrated fabric with a resin to form an impregnated fabric; and
    adhering the impregnated fabric to a substrate.

29. The method according to claim 28, wherein the mixture contains an approximately one-to-one ratio of poly(p-phenylene-2, 6-benzobisoxazole) and polytetrafluoroethylene.

30. The method according to claim 28, wherein the liner is from 10 to 60 percent by weight of the resin.

31. The method according to claim 28, wherein the liner is from 30 to 40 percent by weight of the resin.

32. The method according to claim 28, wherein the second durable fabric is a meta-aramid.

33. The method according to claim 28, wherein the second durable fabric includes poly(p-phenylene-2, 6-benzobisoxazole).

34. The method according to claim 28, wherein the resin is a condensation polyimide resin.

35. The method according to claim 28, wherein the resin is an addition polyimide resin.

36. The method according to claim 28, wherein the resin is a phenolic resin.

37. The method according to claim 28, wherein the resin is an epoxy resin.

38. The method according to claim 28, wherein the resin is a vinyl-phenolic resin.

39. The method according to claim 28, wherein the resin is a methacrylate resin.

40. The method according to claim 28, wherein the resin is a cyanoacrylate resin.

41. The method according to claim 28, wherein the resin is a polyester resin.

42. The method according to claim 28, further including curing the resin.

43. The method according to claim 28, further including at least one of:
    carding the mixture to form the non-woven fabric;
    layering the mixture to form the non-woven fabric; and
    needling the mixture to form the non-woven fabric.

44. A method of producing a self-lubricating liner, the method comprising:
    providing a mixture of poly(p-phenylene-2, 6-benzobisoxazole) and polytetrafluoroethylene;
    forming a woven fabric from the mixture;
    impregnating the woven fabric with a resin to form an impregnated fabric; and
    adhering the impregnated fabric to a substrate.

45. The method according to claim 44, wherein the mixture contains an approximately one-to-one ratio of poly(p-phenylene-2, 6-benzobisoxazole) and polytetrafluoroethylene.

46. The method according to claim 44, wherein the liner is from 10 to 60 percent by weight of the resin.

47. The method according to claim 44, wherein the liner is from 30 to 40 percent by weight of the resin.

48. The method according to claim 44, wherein the resin is a condensation polyimide resin.

49. The method according to claim 44, wherein the resin is an addition polyimide resin.

50. The method according to claim 44, wherein the resin is a phenolic resin.

51. The method according to claim 44, wherein the resin is an epoxy resin.

52. The method according to claim 44, wherein the resin is a vinyl-phenolic resin.

53. The method according to claim 44, wherein the resin is a methacrylate resin.

54. The method according to claim 44, wherein the resin is a cyanoacrylate resin.

55. The method according to claim 44, wherein the resin is a polyester resin.

56. The method according to claim 44, further including curing the resin.

57. A bushing device, comprising:
- an o-shaped body having a raceway; and
- a self-lubricating liner coupled to the raceway, wherein the liner includes poly(p-phenylene-2, 6-benzobisoxazole), polytetrafluoroethylene, and a resin.

58. The device according to claim 57, wherein the poly (p-phenylene-2, 6-benzobisoxazole) and polytetrafluoroethylene are in an approximately one-to-one ratio.

59. The device according to claim 57, wherein the resin is from 10 to 60 percent by weight of the liner.

60. The device according to claim 57, wherein the resin is from 30 to 40 percent by weight of the liner.

61. The device according to claim 57, wherein the resin is a condensation polyimide resin.

62. The device according to claim 57, wherein the resin is an addition polyimide resin.

63. The device according to claim 57, wherein the resin is a phenolic resin.

64. The device according to claim 57, wherein the resin is an epoxy resin.

65. The device according to claim 57, wherein the resin is a vinyl-phenolic resin.

66. The device according to claim 57, wherein the resin is a methacrylate resin.

67. The device according to claim 57, wherein the resin is a cyanoacrylate resin.

68. The device according to claim 57, wherein the resin is a polyester resin.

69. The device according to claim 57, further including a second durable fabric coupled to the liner.

70. The device according to claim 69, wherein the second durable fabric is a meta-aramid.

71. The method according to claim 69, wherein the second durable fabric includes poly(p-phenylene-2, 6-benzobisoxazole).

72. A bearing device, comprising:
- an outer bearing member;
- an inner bearing member; and
- a self-lubricating liner located between the outer bearing member and the inner bearing member, wherein the liner includes poly(p-phenylene-2, 6-benzobisoxazole), polytetrafluoroethylene, and a resin.

73. The device according to claim 72, wherein the poly (p-phenylene-2, 6-benzobisoxazole) and polytetrafluoroethylene are in an approximately one-to-one ratio.

74. The device according to claim 72, wherein the liner is adhered to the inner bearing member.

75. The device according to claim 72, wherein the liner is adhered to the outer bearing member.

76. The device according to claim 72, wherein the resin is from 10 to 60 percent by weight of the liner.

77. The device according to claim 72, wherein the resin is from 30 to 40 percent by weight of the liner.

78. The device according to claim 72, wherein the resin is a condensation polyimide resin.

79. The device according to claim 72, wherein the resin is an addition polyimide resin.

80. The device according to claim 72, wherein the resin is a phenolic resin.

81. The device according to claim 72, wherein the resin is an epoxy resin.

82. The device according to claim 72, wherein the resin is a vinyl-phenolic resin.

83. The device according to claim 72, wherein the resin is a methacrylate resin.

84. The device according to claim 72, wherein the resin is a cyanoacrylate resin.

85. The device according to claim 72, wherein the resin is a polyester resin.

86. The device according to claim 72, further including a second durable fabric coupled to the liner.

87. The device according to claim 86, wherein the second durable fabric is a meta-aramid.

88. The device according to claim 86, wherein the second durable fabric includes poly(p-phenylene-2, 6-benzobisoxazole).

89. A contact-bearing member, comprising:
- a generally flat surface; and
- a self-lubricating liner that is attached to the generally flat surface, wherein the liner includes poly(p-phenylene-2, 6-benzobisoxazole), polytetrafluoroethylene, and a resin.

90. The member according to claim 89, wherein the poly(p-phenylene-2, 6-benzobisoxazole) and polytetrafluoroethylene are in an approximately one-to-one ratio.

91. The member according to claim 89, wherein the liner is adhered to the outer bearing member.

92. The member according to claim 89, wherein the resin is from 10 to 60 percent by weight of the liner.

93. The member according to claim 89, wherein the resin is from 30 to 40 percent by weight of the liner.

94. The member according to claim 89, wherein the resin is a condensation polyimide resin.

95. The member according to claim 89, wherein the resin is an addition polyimide resin.

96. The member according to claim 89, wherein the resin is a phenolic resin.

97. The member according to claim 89, wherein the resin is an epoxy resin.

98. The member according to claim 89, wherein the resin is a vinyl-phenolic resin.

99. The member according to claim 89, wherein the resin is a methacrylate resin.

100. The member according to claim 89, wherein the resin is a cyanoacrylate resin.

101. The member according to claim 89, wherein the resin is a polyester resin.

102. The member according to claim 89, further including a second durable fabric coupled to the liner.

103. The member according to claim 102, wherein the second durable fabric is a meta-aramid.

104. The member according to claim 102, wherein the second durable fabric includes poly(p-phenylene-2, 6-benzobisoxazole).

* * * * *